United States Patent [19]

Kamio et al.

[11] Patent Number: 5,514,049
[45] Date of Patent: May 7, 1996

[54] THROTTLE CONTROL DEVICE

[75] Inventors: Shigeru Kamio, Nagoya; Mitsuo Hara, Aichi, both of Japan

[73] Assignee: Nippondenso Co., Ltd., Kariya, Japan

[21] Appl. No.: 74,477

[22] Filed: Jun. 11, 1993

[30] Foreign Application Priority Data

Jun. 15, 1992 [JP] Japan .................... 4-155407

[51] Int. Cl.⁶ .................................. B60K 41/04
[52] U.S. Cl. .................. 477/111; 477/110; 123/399
[58] Field of Search .................. 477/110, 111; 123/396, 399

[56] References Cited

U.S. PATENT DOCUMENTS

| | | | |
|---|---|---|---|
| 4,453,516 | 6/1984 | Filsinger | 123/399 X |
| 4,508,078 | 4/1985 | Takeuchi et al. | 123/399 |
| 4,581,924 | 4/1986 | Otobe et al. | 123/399 |
| 4,881,428 | 11/1989 | Ishikawa et al. | 477/111 X |
| 4,993,383 | 2/1991 | Wokan et al. | |
| 5,199,401 | 4/1993 | O'Neil et al. | 123/399 X |
| 5,215,057 | 6/1993 | Sato et al. | 123/399 X |

FOREIGN PATENT DOCUMENTS 2-94337 7/1990 Japan.

Primary Examiner—Charles A. Marmor
Assistant Examiner—Peter Kwon
Attorney, Agent, or Firm—Cushman, Darby & Cushman

[57] ABSTRACT

A throttle control device for a vehicle engine enables adjustment of pedal feeling of an accelerator pedal in accordance with a state of operation of the engine. A throttle valve provided in an intake pipe of an engine is actuated to vary its opening by a stepping motor. The accelerator pedal is provided with an accelerator opening sensor 10 which detects an amount of step down or operation of the accelerator pedal. The engine is provided with a water temperature sensor capable of detecting a temperature of cooling water circulated through the engine. A shift lever device is provided with a shift position sensor capable of sensing a range to which the shift lever has been operated. A CPU sets an amount of play of the accelerator pedal, i.e., a width of an insensitive zone, in accordance with the temperature of the cooling water detected by the water temperature sensor and the shift position detected by the shift position sensor. The CPU controls the stepping motor to attain a throttle opening corresponding to the accelerator operation amount after correction of the latter in accordance with the set amount of play of accelerator pedal operation.

9 Claims, 5 Drawing Sheets

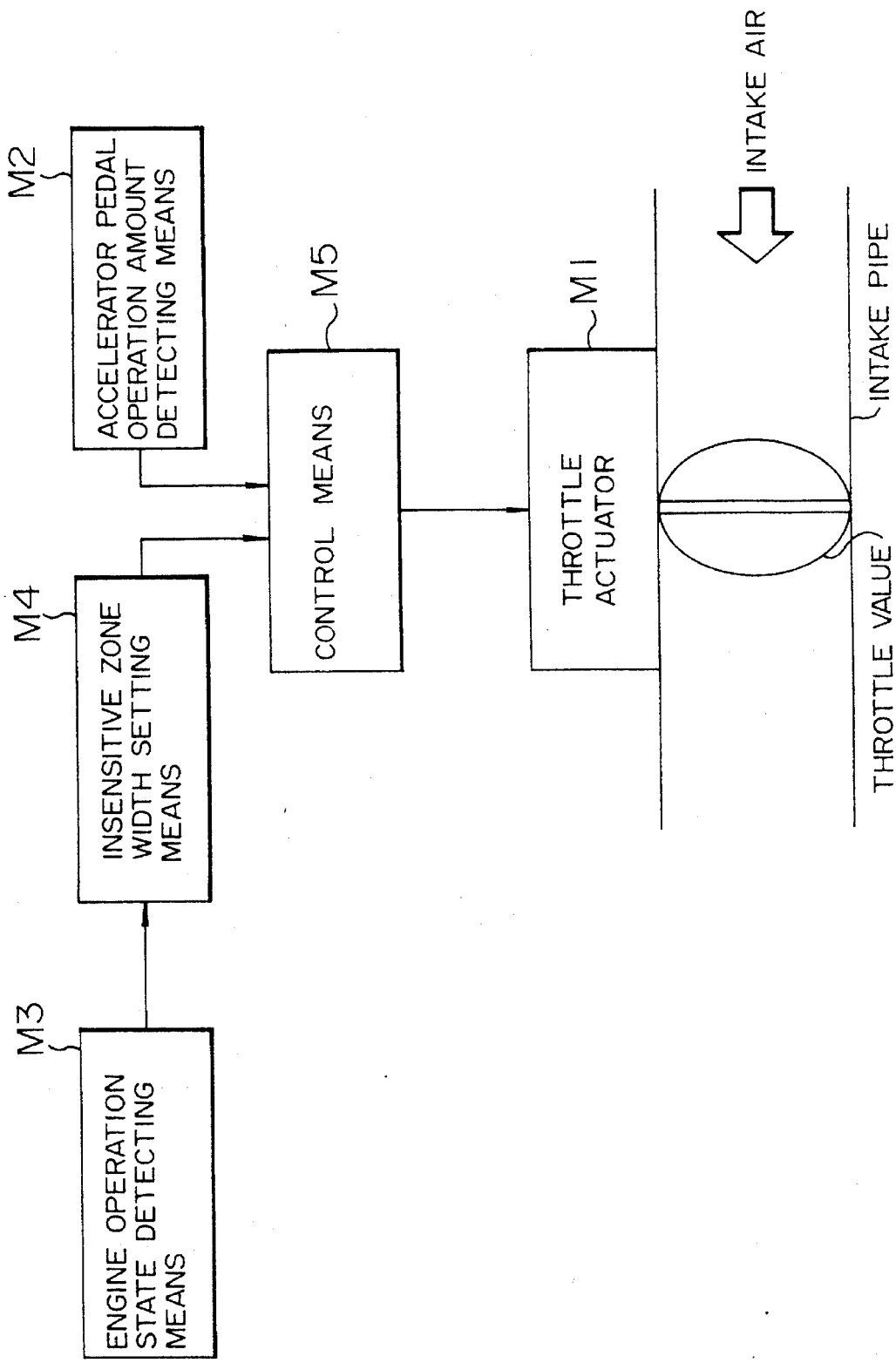

THROTTLE CONTROL DEVICE

BACKGROUND OF THE INVENTION

1. Field of the Invention

The present invention relates to a throttle control device for vehicle engines and, more particularly, to a throttle control device for controlling the opening of a throttle valve in accordance with the amount of operation of an accelerator pedal.

2. Description of the Related Art

In general, a known throttle control device employs a wire which mechanically interconnects an accelerator pedal and a throttle valve. In such a throttle control device, the degree of throttle valve activation is precisely determined based on factors including the urging force of a return spring secured to the accelerator pedal and friction of the link system. Therefore, cannot determination of throttle valve activation be adjusted to suit particular drivers. Consequently, problems are caused such as impacting acceleration of the engine and vehicle due to excessive pressure applied to the accelerator pedal when quick acceleration of the vehicle is necessary.

Under such a circumstance, a device has been proposed which incorporates a damper so associated with the accelerator pedal as to limit the rate of activation of the throttle valve, thus enabling adjustment of the characteristic of the acceleration pedal.

This device, however, could adjust the operation characteristic of the acceleration pedal only within the preset range and, therefore, could not adapt the characteristic to the actuate state of running of the vehicle.

Meanwhile, there is an increasing demand for improving pedal sensitivity, i.e., the feeling imparted to the driver when stepping down the accelerator pedal, as well as higher degree of vehicle operating stability of. Such demands, however, could not be met by the conventional devices.

SUMMARY OF THE INVENTION

Accordingly, an object of the present invention is to provide a throttle control device which incorporates a simple means for varying the relationship between the amount of pressure applied to the accelerator pedal and the degree of throttle valve opening, so as to realize stable vehicle operation with better pedal sensitivity, thereby meeting the above-described demand.

To this end, according to the present invention, there is provided a throttle control device which comprises, as shown in FIG. 7, a throttle actuator M1 for actuating a throttle valve disposed in an intake pipe of an engine to provide greater or smaller throttle opening; accelerator pedal operation amount detecting means M2 for detecting an amount of operation of an accelerator pedal; engine operating state detecting means M3 for detecting a state of operation of the engine; insensitive zone width setting means M4 for setting a width of the insensitive zone in which the throttle valve is kept closed when the accelerator pedal is in a predetermined range of operation starting from a non-operated position; and control means M5 for controlling the throttle actuator M1 so as to attain a throttle opening corresponding to the amount of the accelerator pedal operation detected by the accelerator pedal operation amount detecting means M2, after correction of the accelerator pedal operation amount in accordance with the width of the insensitive zone set by the insensitive zone width setting means.

In the throttle control device of the present invention, the insensitive zone width setting means M4 sets the width of the insensitive zone in accordance with the state of operation of the engine sensed by the engine operation state detecting means M3. The control means M5 controls the throttle actuator M1 using the width of the insensitive zone set by the insensitive zone width setting means M4 so as to attain a throttle opening corresponding to the amount of operation of the accelerator pedal detected by the pedal operation amount detecting means M2. Consequently, the width of the insensitive zone is set in accordance with the state of operation of the engine.

A greater width of the insensitive zone requires a greater amount of accelerator pedal activation/movement by the driver and, hence, a greater force against the return spring. This change is perceived by the driver as if an adjustment of the pedal feeling. Conversely, when the width of the insensitive zone is reduced, a desired engine output torque is obtained with correspondingly decreased amounts of activation/movement of the accelerator pedal and, hence, a smaller reaction force from the return spring, which imparts a "light" pedal feeling to the driver.

BRIEF DESCRIPTION OF THE DRAWINGS

FIG. 7 is a block diagram showing the basic construction of the throttle control device of the present invention.

DESCRIPTION OF THE PREFERRED EMBODIMENT

The invention will be more fully understood from the following description of a preferred embodiment when the same is read in conjunction with the accompanying drawings.

Figure 1:
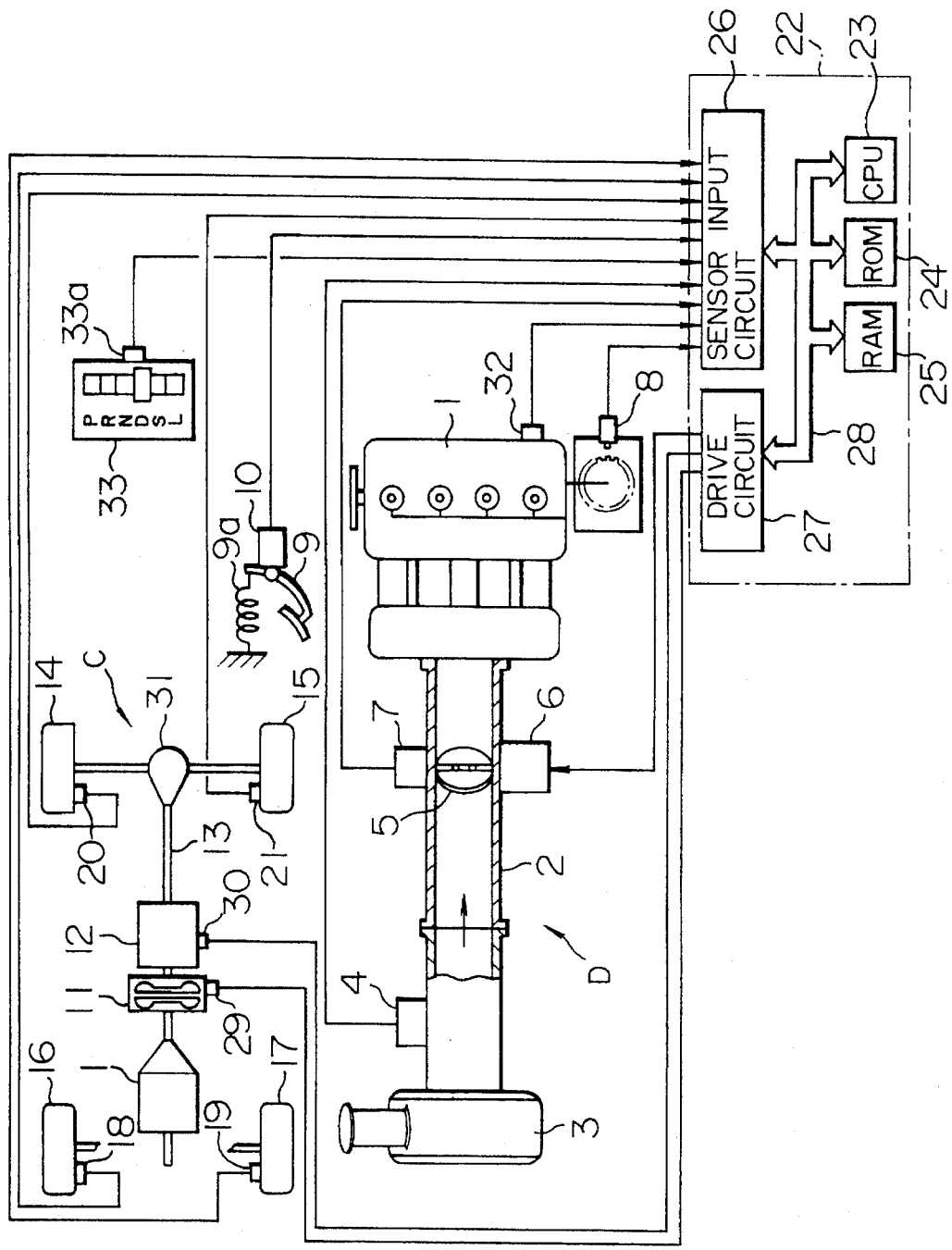
FIG. 1 is a schematic illustration of an embodiment of the throttle control device of the present invention.

Referring first to FIG. 1 which schematically shows the construction of a throttle control device, an arrow C indicates planar arrangement of basic components of a vehicle, while an arrow D indicates an intake system of an engine.

The intake system D includes an intake pipe 2 which is provided with an air cleaner 3 and which is connected to cylinders of the engine 1 so that intake air cleaned by the air cleaner 3 is introduced into the cylinders through the intake pipe 2. The intake pipe 2 also has an air flowmeter 4 which measures the flow rate of the air flowing through the intake pipe 2. A throttle valve 5 for controlling the flow rate of the intake air is disposed at a portion of the intake pipe 2 downstream of the air flowmeter 4. The throttle valve 5 is actuated to vary the degree of opening by a stepping motor 6 which serves as an actuator. A throttle opening sensor 7 associated with the throttle valve 5 senses the amount of rotation of the throttle valve 5 and produces an electric signal proportional to the opening of the throttle valve 5.

The engine 1 has an engine speed sensor 8 for measuring the speed of rotation Ne of the engine shaft and a water sensor 32 which senses the temperature of the cooling water circulated through the engine 1. An accelerator opening sensor 10 is associated with the accelerator pedal 9 so as to deliver an electric signal proportional to the amount Ap of operation (pressure/movement) of the accelerator pedal 9.

As known to those skilled in the art, a return spring for urging the accelerator pedal 9 to the non-stepped position is connected to the accelerator pedal 9, so as to give to the driver a feel of reaction to the stepping down of the accelerator pedal 9.

The output of the engine 1 is transmitted to a drive shaft 13 through a torque converter 11 and an automatic transmission 12. The output of engine 1 is further transmitted to left and right powered wheels 14 and 15 through a differential gear 31 to drive these wheels. A lock-up clutch incorporated in the torque converter 11 operates to selectively provide a direct mechanical connection between the input and output ends of the transmission under the control of a lock-up solenoid 29. The automatic transmission 12 is controlled by a shift solenoid 30 so as to provide varying output speed.

A shift lever device 33 has six shift positions: more specifically, a parking range (P) used when the vehicle is parked, a reverse range (R) for reversing, a neutral range (N) for opening the power transmission path, and drive (D), second (S) and low (L) ranges which are used for normal running of the vehicle. The shift lever device 33 is provided with a shift position sensor 33a for detecting the shift position selected by the shift lever device 33.

The driving system further has wheel speed sensors 18, 19 for detecting the speeds of left and right non-powered wheels 16, 17 which are front wheels in this case, and wheel speed sensors for detecting the speeds of the left and right powered wheels 14, 15 which are rear wheels in this case. The wheel speed sensors 18, 19, 20 and 21 detect the speeds of the corresponding wheels 14, 15, 16 and 17 by means of electromagnetic pickups.

The air flowmeter 4, stepping motor 6, throttle opening sensor 7, engine speed sensor 8, water temperature sensor 32, accelerator opening sensor 10, wheel speed sensors 18, 19, 20, 21 and the shift position sensor 33a are connected to an electronic control unit (referred to as "ECU" hereinafter) 22. The ECU 22 has a logical operation circuit which is composed mainly of a CPU 23, a ROM 24 and a RAM 25 and is connected to input/output interface circuits such as a sensor input circuit 26 and a drive circuit 27 through a common bus 28.

The CPU 23 receives, through the sensor input circuit 26, signals from the sensors such as the air flowmeter 4, throttle opening sensor 7, engine speed sensor 8, water temperature sensor 32, accelerator opening sensor 10 and the wheel speed sensors 18, 19, 20 and 21. The CPU 23 delivers a drive signal for activating the stepping motor 6 through the drive circuit 27, in accordance with the signals from the sensors and in accordance with programs and data stored in the ROM 24 and the RAM 25. The CPU 23 also detects the shift position based on the signal from the shift position sensor of the shift lever device 33 and controls the lock-up solenoid 29 of the torque converter 11 in accordance with the shift position, thereby controlling the shift solenoid 30 of the automatic transmission 12.

In the illustrated embodiment, the stepping motor 6 serves as a throttle actuator, while the accelerator opening sensor 10 forms the accelerator pedal operation amount detecting means. Furthermore, the water temperature sensor 32 and the shift position sensor 33a of the shift lever device 33 in cooperation form an engine operation state detecting means. The CPU functions both as insensitive zone width setting means and the control means.

A description will now be given of the operation of the illustrated embodiment of the throttle control device of the present invention.

Figure 3:
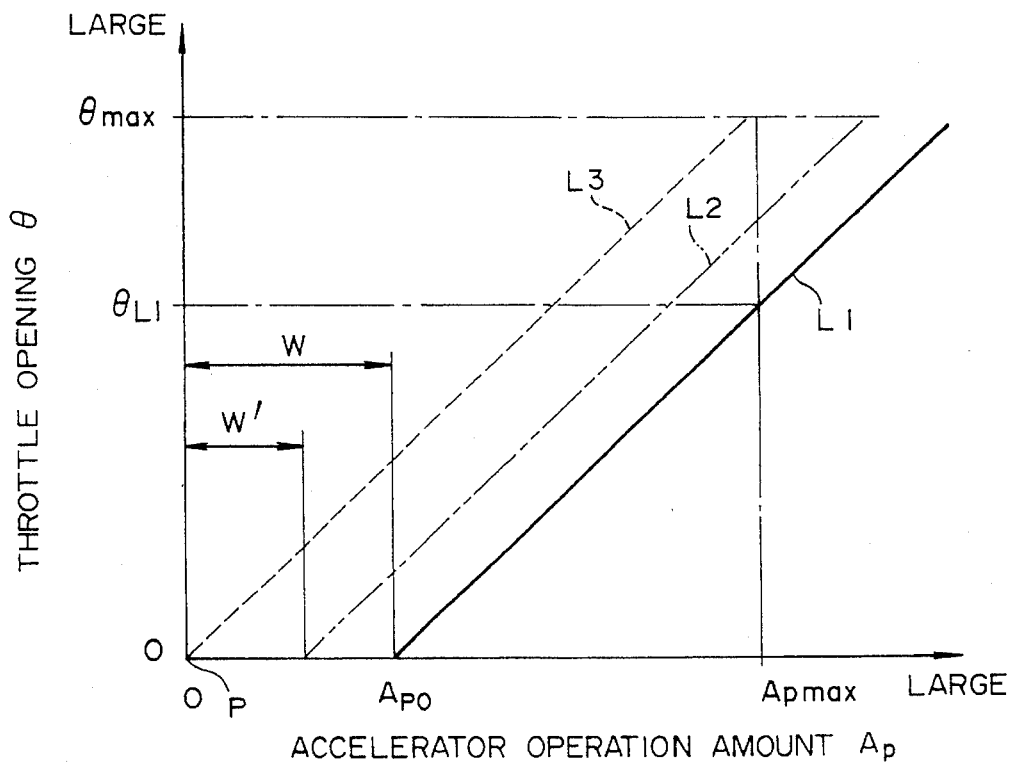
FIG. 3 is a chart illustrative of the relationship between the amount of operation of the accelerator pedal and the throttle opening.

The CPU 23 provides such a relationship between the amount Ap of operation of the accelerator pedal and the throttle opening $\theta$ that has an insensitive zone in which the throttle valve 5 is kept closed (zero opening) over the range between non-stepped position of the accelerator pedal 9 and a predetermined step down position of the accelerator pedal. The CPU 23 also has a function to vary the width W of such an insensitive zone. More specifically, the CPU 23 has a function to shift the characteristic curve from a position indicated by L1 to a position indicated by L2 in FIG. 3, thus changing the width of the insensitive zone from W to W'. In the illustrated embodiment, the amount of play Ap0 (insensitive zone width) is determined with respect to a characteristic curve L3 which passes the point P of origin, and the throttle opening $\theta$ corresponding to the characteristic curve L3 is determined by subtracting the play amount Ap0 from the amount Ap of operation of the accelerator pedal detected by the accelerator opening sensor 10.

The accelerator pedal operation amount Ap varies within the range between zero and Apmax. Similarly, the throttle opening $\theta$ varies within the range between zero and $\theta$max. Therefore, the throttle opening $\theta$ is limited when the insensitive zone width W is increased. Thus, on the characteristic curve L1, the throttle opening $\theta$ is limited to $\theta_{L1}$.

A practical example of operation of the CPU 23 will be described hereinafter.

Figure 2:
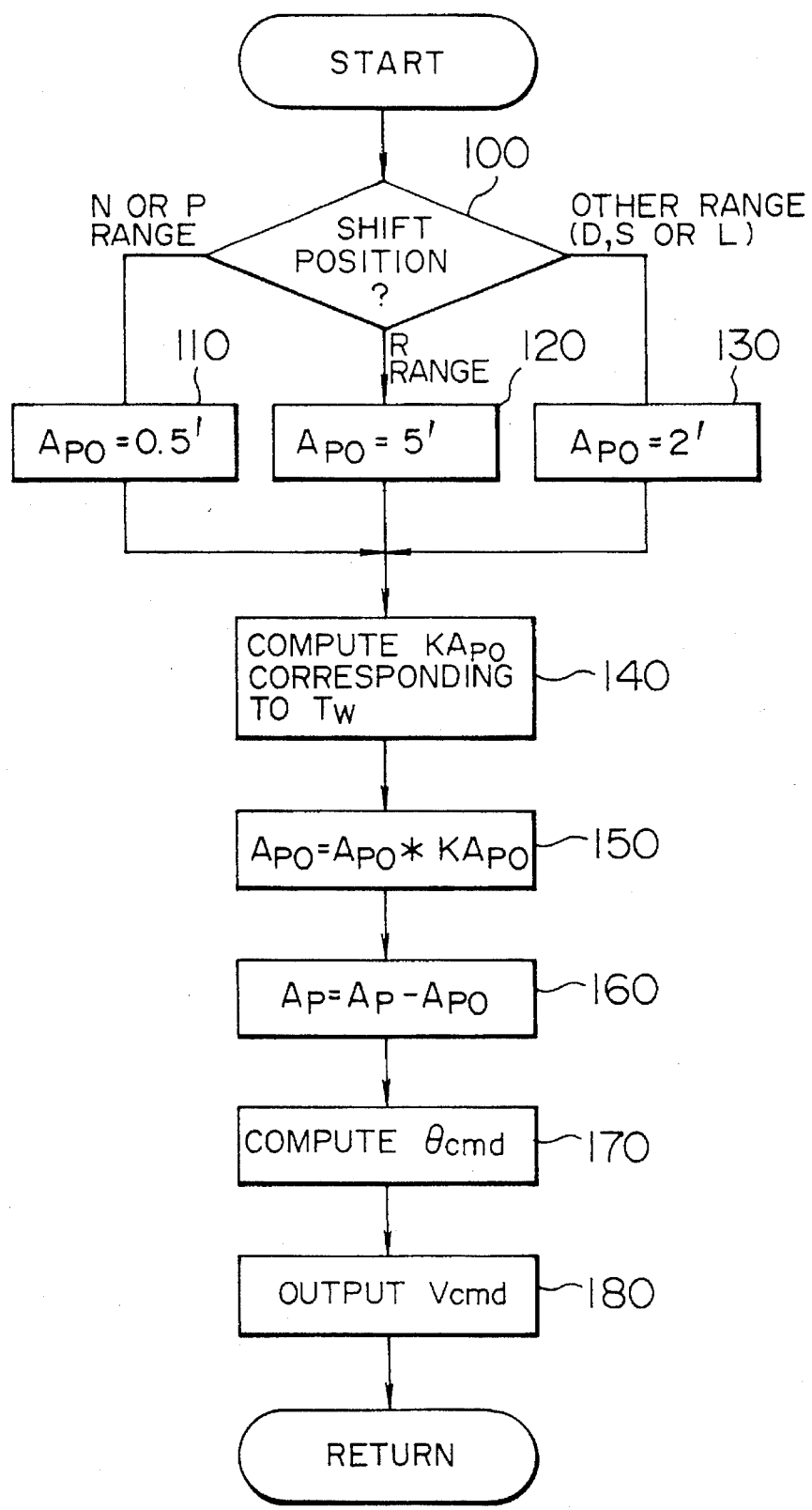
FIG. 2 is a flow chart explanatory of the operation routine of the throttle control device shown in FIG. 1.

FIG. 2 shows the flow of a routine which is executed by the CPU 23 at a predetermined time interval. In Step 100, the CPU 23 detects the shift position of the shift lever device 33. The process proceeds to Step 110 when the shift lever is in the neutral (N) range or the parking (P) range and to Step 120 when the shift lever is in the reverse (R) range. The process proceeds to Step 130 if the shift lever is in the drive (D) range, second (S) range or in the low (L) range. In Step 110, the CPU sets the play amount Ap0 to a small value (Ap0=0.5°), whereas, in Step 120, the play amount Ap0 is set to a large value (Ap0=5°). In Step 130, the play amount Ap0 is set to an intermediate value (Ap0=2°).

Figure 4:
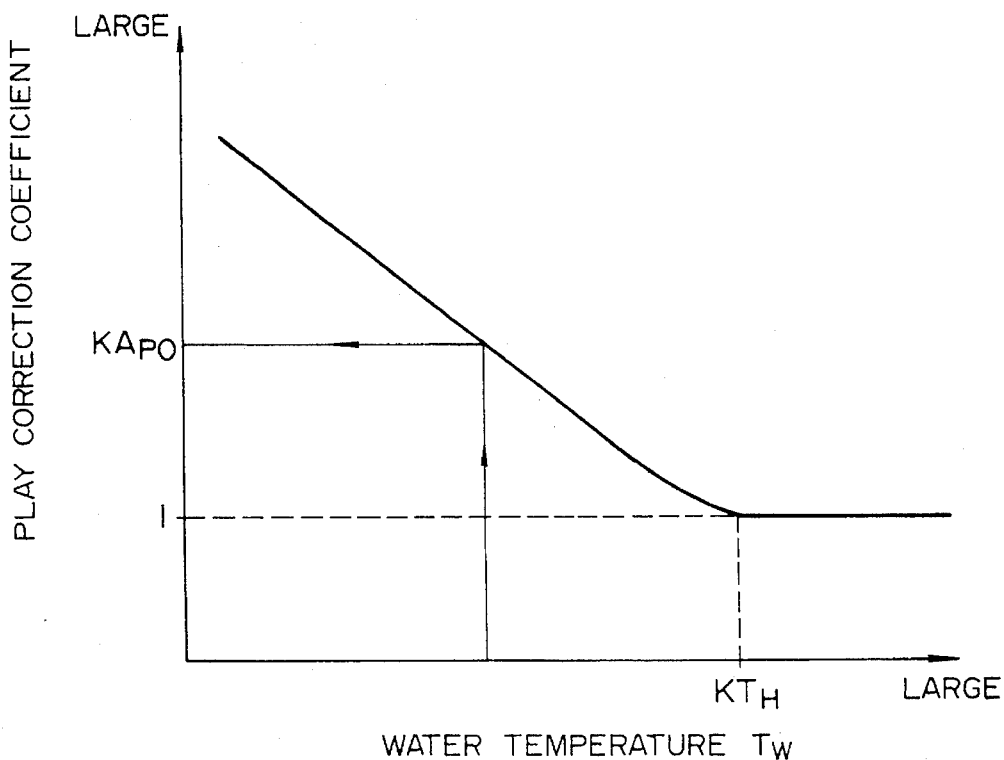
FIG. 4 is a chart illustrative of the relationship between the water temperature and the play correction coefficient.

After the play amount Ap0 is set in Step 110, 120 or 130, the process proceeds to Step 140 in which a play correction coefficient KAp0 is determined based on the data written in a map shown in FIG. 4 in accordance with the water temperature Tw detected by the water temperature sensor 32. The map in FIG. 4 is so formed that, when the water temperature Tw is not higher than a predetermined level KTw, the play correction coefficient KAp0 increases as the water temperature Tw gets lower, whereas, when the predetermined level KTw is exceeded, the play correction coefficient KAp0 is constantly set to "1". In Step 150, the CPU 23 multiplies the play amount Ap0 set in one of Steps 110, 120 and 130 with the play correction coefficient KAp0 computed in Step 140, thereby outputting the product Ap0·KAp0 as the corrected play amount Ap0. amount Ap0.

In Step 160, the CPU subtracts the play amount Ap0 calculated in Step 150 from the accelerator operation amount Ap detected by the accelerator opening sensor 10, arid delivers the result (Ap–Ap0) as the accelerator operation amount Ap which has been corrected in accordance with the set width of the insensitive zone.

Figure 5:
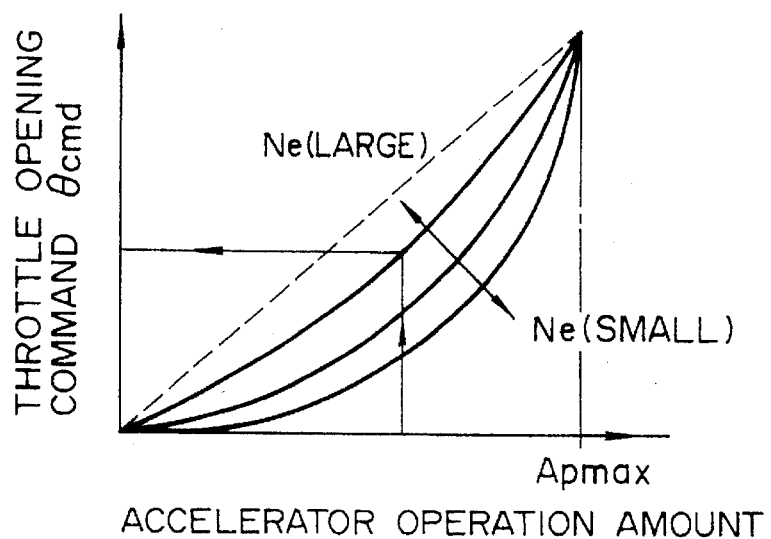
FIG. 5 is a chart illustrative of the relationship between the amount of operation of the accelerator pedal and the throttle opening command with the engine speed as a parameter.
Figure 6:
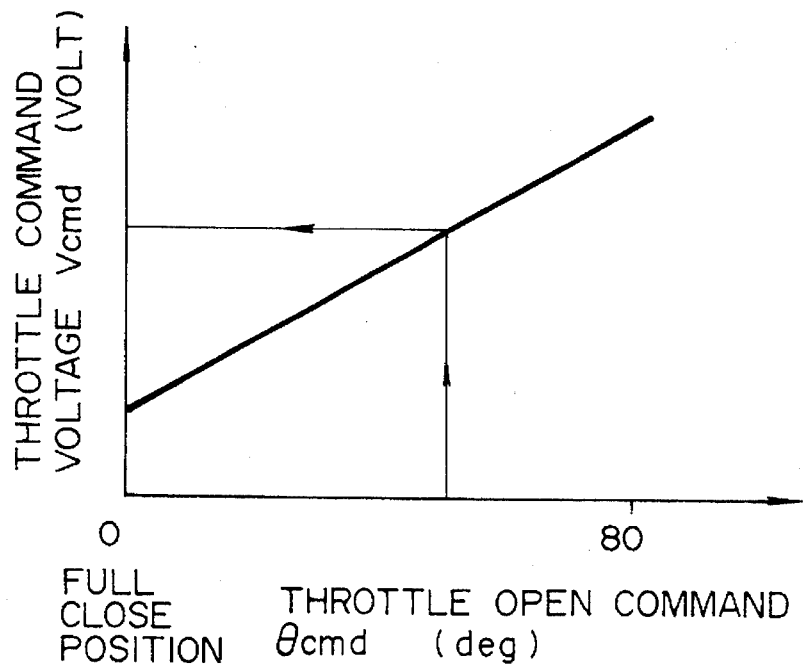
FIG. 6 is a chart illustrative of the relationship between the throttle opening command and the throttle command voltage.

In Step 170, the CPU 23 computes the throttle opening command θcmd based on the accelerator operation amount Ap and the engine speed Ne detected by the engine speed sensor 8, using a map which is shown in FIG. 5. FIG. 5 shows the relationship between the accelerator operation amount Ap (abscissa) and the throttle opening command θcmd (ordinate), using the engine speed Ne as the parameter. Then, the CPU 23 calculates, in Step 180, the throttle command voltage Vcmd in accordance with the throttle opening command θcmd using a map shown in FIG. 6 and delivers the command voltage Vcmd to the driving circuit 27.

The driving circuit 27 activates the stepping motor 6 in accordance with the throttle command voltage Vcmd, and the stepping motor 6 actuates the throttle valve 5 to the commanded opening position.

Thus, in the illustrated embodiment, the amount Ap0 of play of the accelerator pedal 9, i.e., the width of the insensitive zone, is determined in accordance with the shift position (P, R, N, D, S or L) of the shift lever device 33 detected by the shift position sensor 33a and the cooling water temperature Tw detected by the water temperature sensor 32, and the throttle opening command θcmd is calculated based on the play amount Ap0 and the accelerator operation amount Ap detected by the accelerator opening sensor 10. The opening command θcmd is then converted into the throttle command voltage Vcmd, and the stepping motor 6 is activated in accordance with this throttle command voltage Vcmd so as to actuate the throttle valve 5 to greater or smaller opening.

According to this arrangement, when the engine 1 is not loaded while the shift lever in the shift lever device 33 is neutral (N) range or in the parking (P) range, the amount Ap0 of play is set to a small value in Step 110 of FIG. 2, thus enabling a quicker response of the throttle valve 5. When the shift lever is in the reverse (R) range, the play amount Ap0 is set to a large value in Step 120 of the flow shown in FIG. 2, thus eliminating the danger of quick acceleration in response to stepping down of the accelerator pedal and improving the operability of the accelerator pedal 9. When the shift position is the drive (D) or second (S) or low (L) range, the play amount Ap0 is set to a medium value in Step 130 of the flow shown in FIG. 2, whereby the operability of the accelerator pedal 9 and the response of the throttle valve 5 are made compatible at moderate levels.

In the illustrated embodiment, the play correction coefficient KAp0 is determined by using the map shown in FIG. 4 such that the lower the cooling water temperature, the greater the play amount Ap0. This eliminates quick acceleration of the engine when the engine is still in cold state, thus protecting the engine 1.

It is thus possible to adjust the operation characteristic of the accelerator pedal 9 in accordance with the state of operation of the engine to adapt the vehicle running performance and the pedal feeling to the driver's taste.

When the play amount Ap0 is set to a large value, the driver has to step down the accelerator pedal by a greater amount for attaining required throttle opening, encountering with a greater reaction force produced by the return spring 9a. Thus, in order to obtain desired level of the engine output torque, the driver has to exert a greater force on the accelerator pedal than the case where the play amount Ap0 is set to a smaller value. This imparts to the driver a "heavier" pedal feeling.

Conversely, when the play amount Ap0 is set to a small value, the driver is encountered with a smaller resistance force when stepping down the accelerator pedal, whereby a "light" pedal feeling is obtained.

According to the present invention, the above-described advantage can be brought about by a simple software, without requiring any mechanical system which would intricate the engine system. The throttle control device of the described embodiment, therefore, can be achieved with a simple construction at a low production cost.

Although the invention has been described through its specific form, it is to be understood that the described embodiment is only illustrative and is not intended for limiting the scope of the invention. For instance, either one of the shift lever device 33 and the water temperature 32 may be omitted, although the described embodiment employs both of them.

It is also possible to modify the described embodiment such that the accelerator-throttle characteristic, in addition to the change in the play amount Ap0. For instance, the linear characteristic shown in FIG. 3 may be changed to a curvilinear characteristic with varying gradient, so as to progressively increase or decrease the rate of change in the throttle opening in response to the accelerator pedal operation.

As will be understood from the foregoing description, according to the present invention, it is possible to control the accelerator pedal operation characteristic in accordance with the state of the engine operation, thus offering greater stability of running performance of the vehicle, as well as improved pedal feeling.

What is claimed is:

1. A throttle control device comprising:

a throttle actuator for actuating a throttle valve disposed in an intake pipe of an engine to provide a greater or a smaller throttle opening;

accelerator pedal operation amount detecting means for detecting an amount of operation of an accelerator pedal;

engine operating state detecting means for detecting a state of operation of said engine, said engine operation state detecting means including a shift position sensor for detecting a shift position in a transmission connected to said engine;

insensitive zone width setting means for setting a width of an insensitive zone when said accelerator pedal is in a predetermined range of operation, said throttle valve being kept closed within said insensitive zone; and control means for controlling said throttle actuator so as to attain a throttle opening corresponding to said amount detected by said accelerator pedal operation amount detecting means, after correction of said accelerator pedal operation amount in accordance with said insensitivity zone width set by said insensitive zone width setting means, wherein said insensitive zone width setting means provides a greater insensitivity zone width when said shift position is a reverse position than when said shift position is a forward driving position.

2. A throttle control device according to claim 1, wherein said insensitive zone width setting means provides a greater insensitivity zone width when said shift position is a reverse position than when said shift position is a forward driving position, and provides a greater insensitivity zone width when said shift position is said forward driving position than when said shift position is a parking position.

3. A throttle control device according to claim 1, further including a water temperature sensor for detecting a temperature of cooling water circulated through said engine, wherein said insensitive zone width setting means provides a greater insensitivity zone width for a lower cooling water temperature than for a higher cooling water temperature.

4. A throttle control device for adjusting an output of a vehicle engine, comprising;

engine output instructing means for generating an engine output instruction based on an input;

engine output adjusting means for adjusting said engine output based on said engine output instruction;

setting means for setting an insensitive zone, said engine output instruction being regarded as zero when said input is below said predetermined amount, said engine output instruction being increased based on increases in said input exceeding a predetermined amount;

detecting means for detecting an operating condition of said engine; and insensitive zone width adjusting means for changing said predetermined amount to adjust said insensitive zone width, said change in said predetermined amount being based on said engine operating condition detected by said detecting means, wherein said detecting means produces a direction signal indicative of an operating direction of said vehicle, and wherein said insensitive zone width adjusting means increases said predetermined amount where said direction signal indicates that said vehicle is going to run backward and decreases said predetermined amount when said direction signal indicates that said vehicle is going to run forward.

5. A throttle control device for adjusting an output of a vehicle engine, comprising engine output instructing means for generating an engine output instruction based on an input;

engine output adjusting means for adjusting said engine output based on said engine output instruction;

setting means for setting an insensitive zone, said engine output instruction being regarded as zero when said input is below said predetermined amount, said engine output instruction being increased based on increases in said input exceeding a predetermined amount;

detecting means for detecting an operating condition of said engine; and insensitive zone width adjusting means for changing said predetermined amount to adjust said insensitive zone width, said change in said predetermined amount being based on said engine operating condition detected by said detecting means, wherein said detecting means produces a temperature signal indicative of an engine temperature, and wherein said insensitive zone width adjusting means increases said predetermined amount when said temperature signal indicates a lower temperature and decreases said predetermined amount when said temperature signal indicates a higher temperature.

6. A throttle valve control device according to claim 4, wherein a level of said engine output instruction is limited to a predetermined upper limit.

7. A throttle valve control device according to claim 5, wherein a level of said engine output instruction is limited to a predetermined upper limit.

8. A throttle valve control device according to claim 6, wherein said setting means increases said engine output instruction level to said predetermined upper limit when said engine output instruction level is low while said input coincides with an input upper limit, and said setting means sets said engine output instruction value to said predetermined upper limit when said engine output instruction level is high while said input coincides with said input upper limit.

9. A throttle valve control device according to claim 7, wherein said setting means increases said engine output instruction level; to said predetermined upper limit when said engine output instruction level is low while said input coincides with an input upper unit, and wherein said setting means sets said engine output instruction value to said predetermined upper limit when said engine output instruction level is high while said input coincides with said input upper limit.

* * * * *